(12) United States Patent
Mighani et al.

(10) Patent No.: US 7,675,882 B2
(45) Date of Patent: Mar. 9, 2010

(54) HIERARCHICAL MESH NETWORK FOR WIRELESS ACCESS

(75) Inventors: Farhad Mighani, San Jose, CA (US); Srinvas Vutukury, Cupertino, CA (US); Assimakis F Tzamaloukas, San Jose, CA (US)

(73) Assignee: eXS, Inc., San Mateo, CA (US)

( * ) Notice: Subject to any disclaimer, the term of this patent is extended or adjusted under 35 U.S.C. 154(b) by 0 days.

(21) Appl. No.: 11/815,078

(22) PCT Filed: Jan. 26, 2006
(Under 37 CFR 1.47)

(86) PCT No.: PCT/US2006/002850
§ 371 (c)(1),
(2), (4) Date: Feb. 15, 2008

(87) PCT Pub. No.: WO2006/083696
PCT Pub. Date: Aug. 10, 2006

(65) Prior Publication Data
US 2008/0192713 A1 Aug. 14, 2008

Related U.S. Application Data

(60) Provisional application No. 60/648,774, filed on Feb. 1, 2005.

(51) Int. Cl.
*H04W 4/00* (2009.01)
(52) U.S. Cl. .................. 370/328; 370/217; 370/228

(58) Field of Classification Search ............... None
See application file for complete search history.

(56) References Cited

U.S. PATENT DOCUMENTS

| | | | |
|---|---|---|---|
| 6,353,596 | B1 | 3/2002 | Grossglauser et al. |
| 6,385,201 | B1 | 5/2002 | Iwata |
| 6,728,514 | B2 | 4/2004 | Bandeira et al. |
| 6,751,455 | B1 | 6/2004 | Acampora |
| 6,757,297 | B1 | 6/2004 | Chin |
| 6,831,921 | B2 | 12/2004 | Higgins |

(Continued)

OTHER PUBLICATIONS

International Search Report for International Application No. PCT/US06/02850 filed Jan. 26, 2006.

(Continued)

*Primary Examiner*—Bob A Phunkulh
(74) *Attorney, Agent, or Firm*—Greenberg Traurig, LLP (57) ABSTRACT

A wireless mesh network is configured as a multiple-level hierarchical network, with each level of the hierarchy having a plurality of nodes. Several clusters of nodes each acting as access points may be organized in numerous first-level meshes (102, 106, 110, 112), with each of the first-level meshes being coupled to a second-level mesh having several nodes that act as gateways (G1-G5) to the first-level meshes. The number of nodes in each of the first-level and second-level meshes may be limited to a predetermined number of nodes throughout the full topology of the mesh network in order to improve performance of the mesh network.

40 Claims, 3 Drawing Sheets

U.S. PATENT DOCUMENTS

| | | | |
|---|---|---|---|
| 6,879,574 B2 | 4/2005 | Naghian et al. | |
| 6,965,575 B2 | 11/2005 | Srikrishna et al. | |
| 7,286,489 B2* | 10/2007 | Ades | 370/254 |
| 2002/0042274 A1* | 4/2002 | Ades | 455/445 |
| 2003/0152042 A1 | 8/2003 | Soininen et al. | |
| 2005/0074019 A1* | 4/2005 | Handforth et al. | 370/406 |
| 2006/0018303 A1 | 1/2006 | Sugiarto et al. | |

OTHER PUBLICATIONS

Riad Hartani, "Flow-Based Routing Boosts MPLS Service," EE Times, Sep. 5, 2003.

C. Perkins and S. Das, "Ad hoc On-Demand Distance Vector (AODV) Routing," Network Working Group, Request for Comments 3561, Nokia Research Center, University of California, Santa Barbara, and University of Cincinnati, Jul. 2003.

* cited by examiner

HIERARCHICAL MESH NETWORK FOR WIRELESS ACCESS

RELATED APPLICATION

This application is a national stage filing under 35 U.S.C. 371 of International Application PCT/US2006/002850, filed on Jan. 26, 2006, which claims the benefit of U.S. Application No. 60/648,774 filed on Feb. 1, 2005. The entire teachings of the referenced International Application is incorporated herein by reference. International Application PCT/US2006/002850 was published under PCT Article 21(2) in English.

BACKGROUND

The present disclosure relates generally to communication systems and, more particularly, to wireless broadband communication networks and methods for data-voice transmission and reception.

One form of commonly-used communication system is a so-called "mesh network." A mesh network is a netlike communications network in which there are typically at least two pathways to each node. A fully-meshed network means that every node has a direct connection to every other node, which is often an elaborate and expensive architecture. Most mesh networks are partially meshed and require the traversing of one or more nodes to go from any given node to every other node in the network.

Mesh networks may be implemented as wired and/or wireless networks. When implemented in a wireless form, mesh networks can be used to provide voice, data, and video services to geographic areas that do not yet have a wired telecommunications infrastructure. Although existing cellular phone systems may provide limited wireless services in such areas, cellular systems do not adequately deliver broadband services.

Wireless mesh networks may be particularly valuable in developing countries that do not have a developed traditional telecommunications infrastructure. However, existing wireless mesh solutions are generally designed for developed markets such that they are too expensive for developing countries. Also, existing wireless mesh products typically focus on indoor applications, and are not as suitable for outdoor and roaming applications.

Mesh networks may also be used to provide broadband services to densely populated regions. Examples of such regions may include urban and suburban locations such as housing and apartment developments, university campuses, and research and development and industrial parks. Mesh networks are often used to provide connections for wireless devices in, for example, consumer homes or apartments through the network to a gateway connected to a larger (typically wired) network such as, for example, the Internet. As the number of nodes in such a mesh network increases, and especially in a densely-populated mesh, transmissions from any given node may reach receivers on many other nodes such that the management of interference and routing between such nodes becomes increasingly complex.

One problem sometimes associated with poor routing management in a wireless mesh network is the introduction of communication delays that undesirably creates so-called "jitter" in voice communications. Another problem sometimes related to routing management is the maintaining of efficient bandwidth utilization, which is much more critical to performance in a wireless, as contrasted to a hard-wired, network. Further increasing the complexity of managing interference and routing is that the operation of each node may not be fully under the control of a central operations center and that all traffic in the network preferably should be secure.

Accordingly, it would be desirable to have an improved secure wireless mesh network system and method that is suitable for use in densely-populated areas, reduces routing delays and jitter, and is more affordable for purchase by businesses and consumers in both developed and developing countries.

BRIEF DESCRIPTION OF THE DRAWINGS

For a more complete understanding of the present disclosure, reference is now made to the following figures, wherein like reference numbers refer to similar items throughout the figures.

The exemplification set out herein illustrates particular embodiments, and such exemplification is not intended to be construed as limiting in any manner.

DETAILED DESCRIPTION

The following description and the drawings illustrate specific embodiments sufficiently to enable those skilled in the art to practice the systems and methods described herein. Other embodiments may incorporate structural, logical, process and other changes. Examples merely typify possible variations. Individual components and functions are optional unless explicitly required, and the sequence of operations may vary. Portions and features of some embodiments may be included in or substituted for those of others.

The elements that implement the various embodiments of the present system and method are described below, in some cases at an architectural level. Many elements may be configured using well-known structures. The functionality and processes herein are described in such a manner to enable one of ordinary skill in the art to implement the functionality and processes described herein.

The processing described below may be implemented in the form of special purpose hardware and/or in the form of software or firmware being run by a general-purpose or network or other specialized processor. Data handled in such processing or created as a result of such processing can be stored in any type of memory or other computer-readable medium as is conventional in the art. By way of example, such data may be stored in a temporary memory, such as in the RAM of a given computer system or subsystem. In addition, or in the alternative, such data may be stored in longer-term storage devices, for example, magnetic disks, rewritable optical disks, and so on. For purposes of the disclosure herein, computer-readable media may comprise any form of data storage mechanism, including existing memory technologies as well as hardware or circuit representations of such structures and of such data.

It should also be understood that the techniques of the present system and method might be implemented using a variety of technologies. For example, the methods described herein may be implemented in software running on a programmable microprocessor, or implemented in hardware utilizing either a combination of microprocessors or other specially designed application specific integrated circuits, programmable logic devices, or various combinations thereof. In particular, the methods described herein may be implemented by a series of computer-executable instructions residing on a storage medium such as a carrier wave, disk drive, or other computer-readable medium.

As used herein, an "access point node" means a node in a mesh network that may provide wireless access to at least one end-user device as well as wireless communication with at least one other access point node in the mesh network. A "gateway node" means a node in a mesh network that provides a communication path between at least two levels in a mesh network.

The present disclosure presents a wireless mesh network useful in communications such as, for example, wireless broadband communications, and also presents methods for configuring and operating the network for data and voice transmissions. The mesh network is typically configured as a multiple-level hierarchical network, with each level of the hierarchy having a plurality of nodes. For example, several clusters of nodes each acting as access points may be organized in numerous first-level meshes, with each of the first-level meshes being coupled to a second-level mesh having several nodes acting as gateways to the first-level meshes. The number of nodes in each of the first-level and second-level meshes may be limited to a predetermined number of nodes in order to improve the performance of the mesh network.

Figure 1:
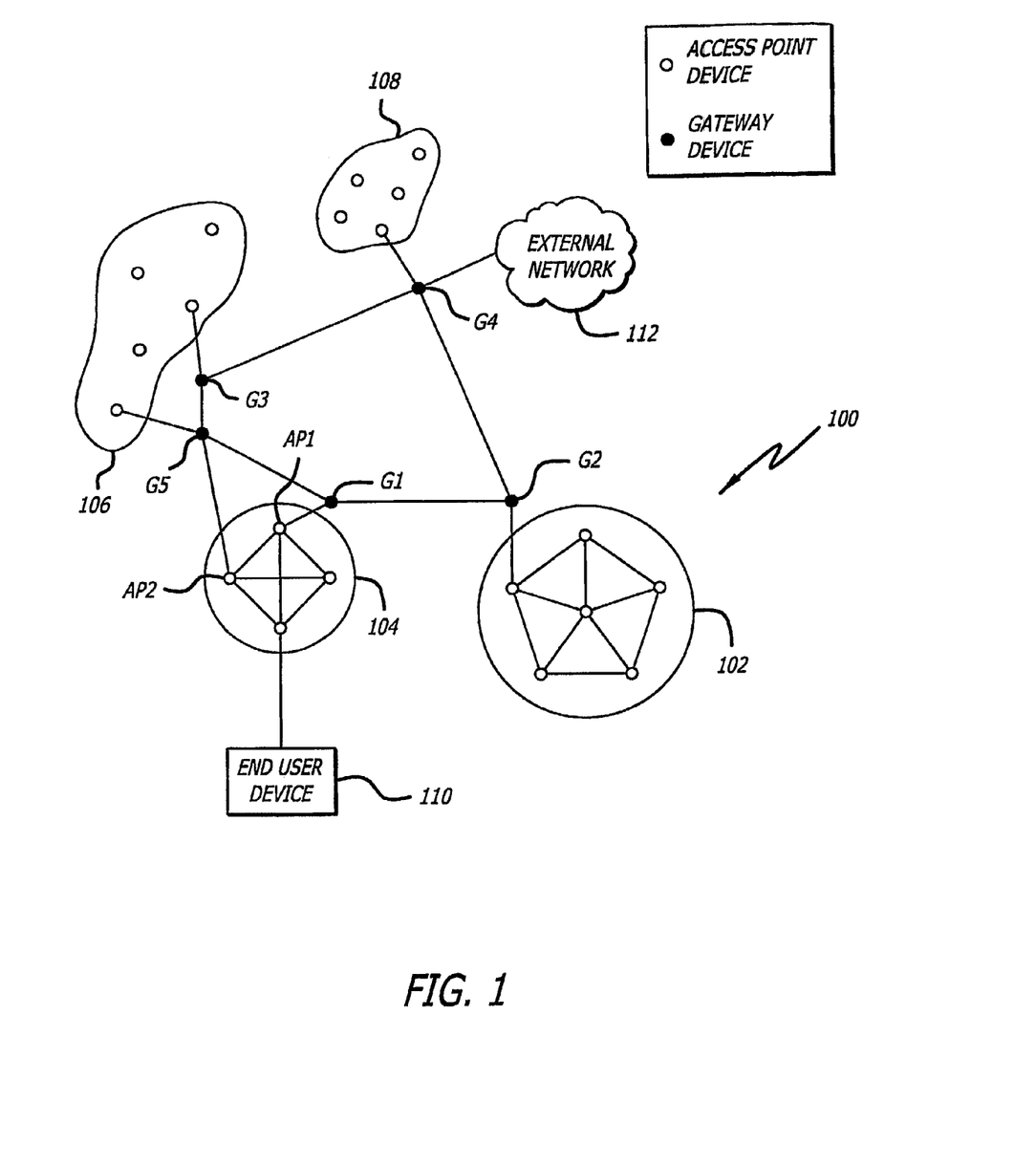
FIG. 1 illustrates a two-level mesh network according to an exemplary embodiment of the present disclosure.

FIG. 1 illustrates a two-level mesh network 100 comprising first-level mesh networks 102, 104, 106, and 108. A mesh network at a particular hierarchical level is sometimes referred to herein as simply a "mesh" for ease of discussion. Each of the first-level meshes comprises a number of nodes configured to communicate with one another. Each first-level mesh may be, for example, a fully-meshed network as in mesh 104 or a partially-meshed network as in mesh 102. Also, some nodes may be connected to only one other node in the first-level mesh.

The nodes in a first-level mesh typically act as an access point to provide wireless communications from an end-user device 110 to mesh network 100. One possible communications use for network 100 is to connect end-user device 110 to an external network 112, which may be, for example, the Internet or another wired or wireless network. For example, external network 112 may be an extension of a business's local area network (LAN) and share security and other attributes of that network facility. Typically, external network 112 will have a much higher bandwidth than that available within network 100, and so it is desired that the communications route from end-user device 110 to external network 112 be as direct as possible.

Mesh 104 may include a number of access point nodes such as nodes AP1 and AP2. Each access point node may be implemented, for example, using an access point device as described below. An access point node may optionally provide multiple virtual secured access points using, for example, multiple SSID's and supporting, for example, wireless security such as through the use of Wired Equivalent Privacy (WEP) or a Virtual Private Network (VPN).

Configuration of and routing of data and voice communications within mesh network 100 may be, for example, implemented using the Ad hoc On-Demand Distance Vector (AODV) routing protocol as described in Experimental Request for Comments (RFC) 3561 of the Network Working Group of the Internet Engineering Task Force (IETF) published July 2003, which RFC is incorporated herein by reference. Each first-level and second-level mesh may be configured, for example, as a single flat mesh using AODV. Each first-level and second-level mesh may also be referred to herein as a submesh or cluster. Each submesh/cluster is preferably configured as a subnet. In one approach, this helps ensure that AODV discovery packets do not propagate throughout the so-called "super-mesh." This helps reduce the overall routing overhead, and may be an advantage for some embodiments that results from the use of a hierarchical mesh topology. Certain modifications to AODV that may be useful with mesh network 100 are described further below.

A second-level mesh includes nodes G1, G2, G3, G4, and G5, each of which may be configured as a gateway device as described below to act as a gateway node to a first-level mesh. Generally, a gateway node in a second-level mesh will communicate with at least one access point node in a first-level mesh. For example, node G1 is in regular communication with node AP1. A gateway node may be coupled to external network 112. Additional gateway nodes may be coupled to other external networks outside of mesh network 100. It should be noted that, for example, node G1 is a member of both first-level mesh 104 and of the second-level mesh that includes nodes G2, G3, G4 and G5, in that node G1 has at least two radios—one radio communicates with first-level mesh 104 and the other radio communicates with the second-level mesh (these radios are discussed further below).

Each first-level mesh generally is configured so that one of its nodes is designated as a lead node to couple to the second-level mesh. A back-up node in the first-level mesh is also generally configured to provide an alternate route to the second-level mesh from the first-level mesh in the event that the lead node ceases to communicate with the second-level mesh. For example, in mesh 104, node AP1 may be a lead node, and node AP2 may be a back-up node. Other nodes in mesh 104 may also act as a lead or back-up node.

End-user device 110 may be, for example, a personal computer, a telephone, a personal digital assistant (PDA) or other device that is enabled for wireless communications, and may enable, for example, data or voice communications over mesh network 100. Examples of such communications include data and Voice over Internet Protocol (VoIP) communications. Wireless standards that may be used for implementing wireless communications within mesh network 100 include, for example, the various 802.11 standards published by the IEEE such as, for example, the 802.11b standard, and all such standards are incorporated herein by reference. Typically, an access point node will be deployed for each end-user desiring to use mesh network 100. For example, each access point node may be deployed in an end-user's residence or business location. Specific examples may include residences located in apartment buildings or housing developments or university campuses, and businesses located in research and development, office, or industrial business parks.

As discussed in more detail below, the radio signal power output of each node in a first-level mesh is controlled so that the node is able to communicate with other nodes in close proximity (e.g., at least one or two other access point nodes in the same first-level mesh), but will not effectively communicate with nodes further away (e.g., in a first-level mesh further away). The irregular circular regions illustrated for each of the first-level meshes 102, 104, 106, and 108 in FIG. 1 are intended to graphically illustrate the approximate effective physical reach of the radio signal output from access point nodes in each such mesh.

Mesh network 100 may be used to provide wireless, multi-service (e.g., voice, data, and/or video) access over small or large regions, and for a small or large number of end-users that may access network 100 from time-to-time using one or more end-user devices. The size of the region serviced varies with each installation. Some regions, for example, cover several square kilometers and include thousands of nodes, while other installations may service a single office building. Although network 100 is illustrated in FIG. 1 as a two-level network, the basic concept may be extended to three, four or more hierarchical levels. For a larger region, typically a three or four-level network will be used.

Figure 2:
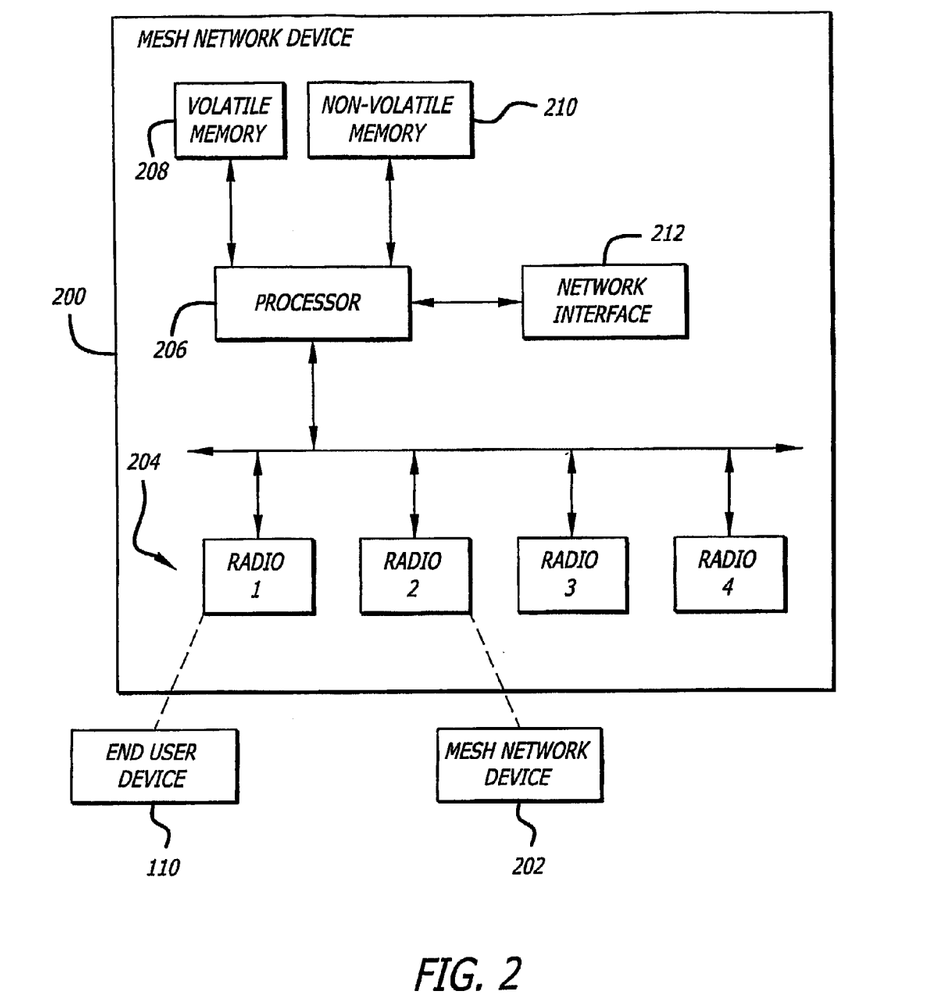
FIG. 2 illustrates a mesh network device, suitable for use in the mesh network of FIG. 1, according to an exemplary embodiment of the present disclosure.

FIG. 2 illustrates a mesh network device 200 suitable for use in the mesh network of FIG. 1. Device 200 is generally a radio device operating under software/firmware control. Device may be configured for use, for example, as either an access point node or a gateway node. This configuration may be software-selectable in device 200. In a typical installation, each device 200 performs meshing and routing in mesh network 100 or other mesh networks under the control of software executing on device 200. The use of device 200 may permit the incremental building of a large mesh network by adding a few such devices at a time. Each added device may automatically configure itself to join the network as described in more detail below.

Device 200 typically connects one or more end-user devices within radio range to the mesh network and may communicate with other mesh network radio devices located at other nodes of the mesh network. In some embodiments, all nodes in the mesh network, or in one or more individual meshes of the network, or for all access point nodes used in the network, or for all gateway nodes in the network, may use the same or substantially the same hardware of device 200. The different operational roles of device 200 such as access point node or gateway node is typically software controlled and programmable. Further, the software may be updated as wireless communication standards change and evolve.

Typically, device 200 is programmed to communicate with other nodes that are in close proximity to device 200 such as, for example, where such close proximity is based on closeness in physical distance between nodes or based on the radio signal strength from other nodes as received by device 200. Close proximity may also be based on the hierarchical relationship of a given node relative to other nodes.

More specifically, device 200 includes radios 204. Generally, device 200 includes at least two radios Radio 1 and Radio 2. Additional radios may included in other embodiments. Radios 204 may be coupled to processor 206, which may be coupled to volatile memory 208 and non-volatile memory 210. Radios 204 may operate simultaneously to support connections to two or more wireless meshes and/or end-user devices. Processor 206 may be, for example, an ARM-based network processor or an XSCALE processor from Intel Corporation. The software running on processor 206 may be, for example, a Linux operating system and include additional software layers, which may vary for different implementations, all the way up to the application level.

Non-volatile memory 210 (e.g., 32 MB flash memory) may be used to store software/firmware that is used to operate processor 206. Volatile memory 208 (e.g., 128 MB SDRAM) may be used to store, for example, a routing table used by device 200 during communications and interaction with mesh network 100. Radios 204 typically are controlled by processor 206. However, in some embodiments, software may be stored on one or more of radios 204 and/or radios 204 be configured to perform some operations independently of processor 206.

It should be noted that radios 204 generally may be able to operate in several different frequency spectrums. For example, Radio 1 in an access point device may communicate with end-user devices on one of the 2.4 GHz (WiFi "b/g band") channels. Radio 1 of each access point node in the same first-level mesh may include, for example, an auto-select feature to select different channels for communications with end-user devices. This auto-select feature may be provided, for example, by the medium access control (MAC) layer in the IEEE 802.11 standard. Other algorithms may be used to select the channel for communication with end-user devices. For example, in one embodiment an algorithm may use the distance of the node from the nearest gateway device that has a wired connection to the Internet as a selection parameter, with each access point device using a different channel based on the nodes ordered distance from the Internet (e.g., the closest node uses a first channel, the next-closest node uses a second channel, . . . ).

Radio 2 in an access point device may communicate with other nodes in a first-level mesh on one of the 5.8 GHz (WiFi "a band") channels. Radio 2 of each access point node in the same mesh typically communicates with each other on the same channel. The use of two radios as described above typically assists in reducing radio interference and allows simultaneous communication of a node with an end user device and with another node in the mesh network, typically reducing delay.

With respect to gateway nodes, the channel selected by each gateway device for communication with a first-level mesh may be selected automatically by an algorithm that uses the distance of the gateway node from the nearest other gateway node, in the same-level mesh, that has a wired connection to the Internet as a selection parameter, with each gateway device using a different channel based on the gateway node's ordered distance from the Internet (e.g., the closest gateway node uses a first channel, the next-closest gateway node uses a second channel, . . . ).

Each of radios 204 may operate as two or more virtual radios so that the gateway node and access node may effectively be incorporated into the same node hardware. In addition, one or more of radios 204 could be incorporated as part of or on the same chip as processor 206.

Processor 206 may be coupled to a network interface 212, which is, for example, an Ethernet network interface. Device 200 may obtain power for some or all operations through network interface 212. Other power sources such as a battery may also be used. Network interface 212 is typically connected to an Ethernet or other interface at the location of an end-user to, for example, provide connection to a wired network such as a LAN in the end-user's residence or business premises. For example, the Power over Ethernet (PoE) standard may be used to provide power over interface 212.

Device 200 may be, for example, encased in a weather-resistant shell and placed outdoors on the side of a building such as a residential house. Alternatively, certain of devices 200 in a network may be designed for interior use.

Three and Higher-Level Mesh Networks

Figure 3:
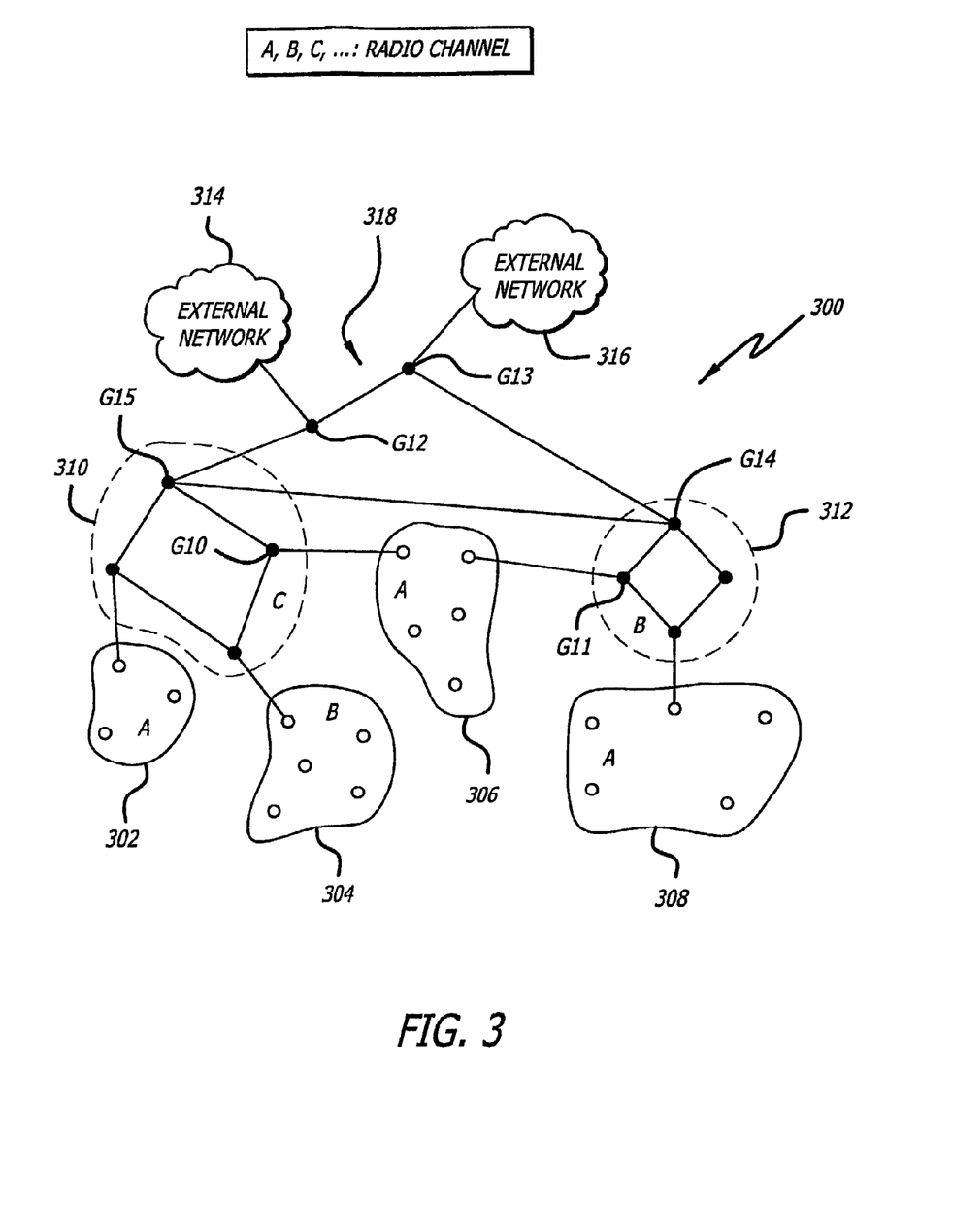
FIG. 3 illustrates a three-level mesh network according to an exemplary embodiment of the present disclosure.

FIG. 3 illustrates a three-level mesh network 300. The structure of network 300 may be, for example, implemented similarly as described for FIG. 1 above except that an additional third hierarchical level is included in network 300. More specifically, meshes 302, 304, 306, and 308 are first-level meshes, and meshes 310 and 312 are second-level meshes. Gateway nodes G10, G11, G12, G13, G14 and G15 are configured into a third-level mesh 318, which is coupled to external networks 314 and 316 using gateway nodes G12 and G13 respectively. External networks 314 and 316 may be similar to external network 112 as discussed above.

Similarly as for each first-level mesh in network 100 described above, each second-level mesh 310 and 312 generally has one node designated as a lead node for communication with the next higher level and another node designated as a back-up node. For example, for mesh 310, node G15 may be a lead node of second-level mesh 310, and node G10 may be a back-up node, each capable of communicating with node G12. Similarly as discussed above for node G1 above, it should be noted that, for example, node G15 is a member of and lead node for second-level mesh 310 and also a member of third-level mesh 318.

As discussed above, communication within each first-level mesh occurs between nodes that are in close proximity. In addition, in a preferred mode of operation, all nodes within a first-level mesh operate on the same channel or frequency. For example, within first-level mesh 306 all nodes communicate on a radio channel "A", with the nodes taking turns in using channel A as is implemented, for example, in the 802.11 standard's MAC functionality to arbitrate channel access.

In addition, network 300 may be configured so that all nodes in adjacent first-level meshes operate on a different channel or frequency. For example, nodes in mesh 304 may communicate on a channel "B", which is expected to reduce interference with communications in mesh 306. Adjacent meshes are typically those meshes that are in closest proximity to a given mesh (and often such adjacent meshes are child meshes at the same hierarchical level in the network under a common parent mesh).

When a mesh is further removed from a first mesh (i.e., is not an adjacent mesh), such a further removed mesh may operate on the same channel as the first mesh. For example, mesh 302 is further removed from mesh 306, and may operate on the same radio channel. Interference is much less likely due to the greater distance between meshes 302 and 306, in contrast to the closer proximity between meshes 304 and 306. In addition, the radio signal power output of each node in meshes 302 and 306 may be controlled as discussed further below so that the effective radio signal range of each of meshes 302 and 306 will not overlap. Typically, meshes 302 and 306 will be sufficiently physically distant such that, with the output transmit power limited within each submesh/cluster as described herein, radio signals from each mesh should not interfere with one another.

Even higher-level mesh networks, such as four-level networks, may be created by applying the principles described above. A large, multiple-level hierarchical mesh network built as described herein may have a size of, for example, about 40,000 nodes in an area of about twenty square kilometers. In one embodiment, it is preferred that such a large number of nodes be divided into groups of about two to four thousand nodes with a three-level mesh network servicing each such group, and with a fourth-level mesh implemented using wired communications (e.g., the Internet) between the Internet gateways for each of the third-level meshes.

The nodes at each level of a hierarchical mesh network are typically configured so that they will interact similarly with one another regardless of the particular mesh level in which they are located. For example, second-level meshes 310 and 312, if they are adjacent as discussed above with respect to first-level meshes, may operate on different channels (indicated in FIG. 3 as "B" and "C"). Often, there is a greater-distance between second and higher-level meshes so that the channel of operation used for operation is less likely to create interference with another mesh of the same level.

Also, it should be noted that even though the mesh network 300 has been described with reference to access point and gateway nodes, and the exemplary use of device 200 for each of these nodes, in other embodiments, it is not required that every node in a first or other level be an access point device or that every node in a second or higher level be a gateway device. It is possible, for example, that in some embodiments both access point nodes and gateway nodes may be present on a second or third-level mesh. Also, some or all of the gateway nodes might additionally act as an access point node.

Control of Radio Channel and Signal Power

As mentioned above, the radio signal power output of each node in a first or other level mesh may be controlled by device 200 so that the nodes within a given mesh are able to effectively communicate, but so that interference is not created with communications in other meshes, and in particular other meshes in close proximity. Software running on device 200 may be used to control the power output, and the software may be stored, for example, in non-volatile memory 210.

For example, software executed by device 200, when operating as a gateway device, may include instructions to control the radio signal power output of Radio 1 by its first scanning for other wireless devices operating in the neighborhood of the Radio 1, and then based on information obtained from this scan, to adjust the radio signal power output of Radio 1 to a level sufficient for device 200 to communicate (e.g., with sufficient reliability and/or bandwidth) with at least one node on a higher-level mesh and/or another node in the same-level mesh. As also mentioned above, device 200 may control the selection of radio channel to use.

In one approach, each node is capable of scanning its neighborhood (i.e., other nearby nodes in the mesh network) to determine/locate the neighboring nodes while using various communications speeds. First, based on the initial gathered information, a cluster is formed and a lead node is selected. The gathered information may also be communicated to a central node (e.g., a mesh network management system, which is located external to the mesh network) for enhancement of the configuration. The central node may refine/reconfigure each of the clusters based on a few selected criteria (e.g., the received signal strength indicator (RSSI) for various communication speeds, the number of nodes, the number of hops within the cluster, and/or the accessibility of the lead and back-up nodes (primary and secondary) to the next higher level of hierarchy in the mesh network).

From the foregoing neighborhood scanning, there are typically two groups of nodes: a first group of nodes that have a high RSSI at even the highest communication speeds, and a second group of nodes with a rather low/moderate RSSI at even the lowest communication speeds. The output power of the first group of nodes may be adjusted such that they are well-heard in their respective clusters. The second group of nodes may each be configured to run at the lowest communication speed, and preferably at an output power sufficiently high so that each node in the second group may be heard by two or more nodes in a nearby cluster.

Radio and Wireless Standards

In order to provide wireless broadband access for both voice and data, a preferred RF standard, which is economic and fairly mature technology, is the 802.11 standard. The protocols, security, QoS, mesh routing protocols, and other aspects of the 802.11 standard are substantially well-defined. One short-coming of the 802.11 standard is its reach and noise (e.g., due to the usage of an unlicensed RF band).

For certain applications (e.g., dense residential), the reach is not a significant issue. However, nodes that aggregate traffic (e.g., back-bone nodes) may require larger coverage, in which case, for example, directional antennas and/or PA's (power amplifiers) with higher gain may be used. Also, other proprietary techniques may be used. Alternatively, to combat coverage and noise shortcomings, other standards (e.g., WiMax) may be used to carry the back-bone traffic. It is preferred that, if used, that the selected hardware implementing the WiMax standard be mature and affordable. Also, the mesh network described herein is preferably RF agnostic so that, with reduced effort, the mesh network can be implemented with yet other RF standards and solutions.

Self-Configuring Nodes

The software used to control device 200 may provide a self-configuring capability so that the device senses other devices in an existing mesh network and configures its routing, security, and other characteristics so that it may connect to and begin operation within the mesh network without the need for initial external interaction between device 200 and a person or computer outside of the existing mesh network. A node typically only needs one link to successfully join the mesh network, but two or more links are usually preferred. Also, nodes may in general be added on the edge or in the middle of an existing mesh network.

More specifically, the access point devices already in, or to be added to, a mesh network may use a mesh-joining algorithm to form first-level meshes. Each access point device at its start-up may probe each channel used to communicate with other access point devices and record, for example, in a table in volatile memory 208, the signal strength reception for each channel and neighboring node identified. The algorithm may then direct the access point device to join or cluster with a number of the closest nodes identified into a first-level mesh (but typically as limited to the maximum total number of nodes permitted within a single first-level mesh, as discussed further below). Also, it is preferred that each device 200, when it will be used in mesh network 300, be configured (e.g., prior to its joining the network) as to whether the device will operate as an access point node or as a gateway node.

Each cluster in the mesh network will preferably have a lead node and a back-up node. The lead node is active, and the back-up node is generally in a standby mode. Both the lead and the back-up nodes (also referred to herein as primary and secondary nodes) are considered as members of the next higher level of hierarchy (e.g., the lead and back-up nodes in a first-level mesh are also considered to be and configured for actual communication, or potential communication in the case of a back-up node, as nodes within the second-level mesh to which they couple the first-level mesh). In typical operation, the back-up node will be visible by the higher-level mesh, but will not be actively communicating with the higher-level mesh. The back-up node should normally itself store the same set routing and other active connections information stored in the lead node so that, in case of failure of the lead node, the back-up node may assume the role of the failed lead node. It should be noted that the failed lead node, when and if it is restored to being again functional, may then assume the role of a back-up node and remain in a standby mode.

Clustering of Nodes in a Hierarchical Mesh Network

When building a mesh network as described herein, in a preferred embodiment, the maximum number of nodes permitted in any given first or other level mesh is limited to a predetermined total number of nodes. This predetermined number may be established, for example, by performance simulation done for a particular mesh network installation.

It has been found in general that this predetermined total number is preferably no more than about 50 nodes, and even more preferably no more than 32 nodes for each level. Also, it has been found that for higher levels in the mesh, the maximum total number of nodes may be preferably less than for the first-level meshes. For example, each node in a mesh network may be programmed (e.g., by software running on each node) so that a mesh network configures itself (as mentioned above) with each first-level mesh having 32 or fewer nodes, each second-level mesh having sixteen or fewer nodes, and each third-level mesh having eight or fewer nodes.

Nodes may self-configure into a hierarchical mesh network by in general scanning for other nodes that are nearest or closest to a given node, which will store information in its routing table to record an identifier of the closest nodes along with the relative signal strengths received. This set of nodes is then bisected incrementally until the total number of nodes is less than the predetermined total number of nodes (e.g., 32 total nodes) permitted in a cluster for a given level.

Mesh Network Routing Protocols

Routing protocols that govern the routing of communications (e.g., data packets) from each node in the mesh network may be implemented, for example, in software stored in non-volatile memory 210 and executed by processor 206 of mesh network device 200. For example, the AODV routing protocol mentioned above may be used. Other embodiments may use other routing protocols. It should be noted that the routing protocols used may be independent of the radio standards used for wireless communications between nodes and with end-user devices.

Each node in a mesh network may typically access a routing table to determine the routes for communications from the node to gateways to external networks (e.g., Internet gateways). This routing table may be stored, for example, in volatile memory 208 and/or non-volatile memory 210. The table entries include the path (nodes) that its packets must traverse to get to that destination.

Device 200 may select routes for a node based on one or more criteria such as, for example, the route that will incur the least number of hops from the node to external network 112 (e.g., the Internet), the quality of the route connection to external network 112, the bandwidth availability along the route, and/or the priority of the end-user device accessing the node.

In one approach, each source node initially sends discovery packets into its immediate submesh to the immediate nodes (i.e., neighbors) connected to the source node. The immediate nodes forward the discovery packets to their respective immediate nodes. Each node maintains information about the discovery packets. If a node receives the discovery packet again, the packet will not be forwarded. Finally, typically multiple copies of the discovery packets will reach a given destination node in the mesh network via different routes.

Each copy of the discovery packet carries information such as, for example, the number of hops from the source node to the destination node, and the load and RSSI on each link. Through the use of the "flooding" method above, the destination node typically learns information about multiple routes to the destination node from the source node. The destination node uses this information to select two of the routes (a primary and a secondary route) and communicates the selected routes back to the source node. The selected routes are stored in the routing tables of the source node. Preferably, each node in the mesh network will know the location of a default gateway to an external network. The routing protocol used above may also include a fairness algorithm so that users of end-user devices will have balanced access to the available bandwidth.

An access point node may implement mesh routing on one of its radios, and the other radio may be the interface to the end-user device in which the radio may examine packet information to implement services all the way up to the application layer (e.g., examination of packet information for security applications). The gateway node may implement mesh routing on both interfaces. Typically, the gateway node will only examine a packet to the extent necessary to determine routing information.

It should also be noted that in some embodiments the mesh network described herein may implement a multicasting technique. In more detail, traffic in the mesh network may be branched off at a node closest to the end nodes that are part of the same multicast group.

Mesh Network Routing

Flow-Based Caching

In the operation of a mesh network as described herein, nodes in the network may be configured to direct, for example, voice traffic leaving the node by using the same route. This is typically desirable when directing voice traffic so that delay and delay jitter and any other problems with voice quality and connection for a given user session are minimized.

Each communications session typically involves a session identifier or ID. Each node may be configured so that it stores these session identifiers and corresponding routes in a route table, and packets associated with the session identifier are directed from the node using a common route. The route table may be stored in, for example, volatile memory 208.

Also, each node may be optionally configured so that an aging mechanism is applied to the routes in the route table. For example, software running on device 200 may invalidate a route if it has been inactive for a predetermined period of time. This aging mechanism is usually configured so that it will not invalidate a route while a session is active.

Mesh Network Routing

Detection of Node Failure

In some embodiments, one or more nodes in a mesh network may be configured to sense the presence of a failed node in another portion of the network (e.g., within the same first or other level mesh or in a different mesh). In a first approach, it may be done actively, such as by sending keep alive packets or signals (known as so-called "keep alives") to the other nodes and awaiting a response. The keep alives may be send, for example, to the immediate neighbors of the node, or to the default or otherwise defined external network gateway for the node.

In another approach, the sending of keep alives may be done passively, such as when a node sends a data packet to another node and awaits an acknowledgement. If no acknowledgement is received within a configurable time period, the packet is re-transmitted. This may be tried a number of times. If no acknowledgement packet is received after a certain number of re-tries, then the route is then considered to be down. Using either method above, each node may be programmed to periodically check for other nodes that have failed.

Upon detection of a failed node, the detecting node may communicate information relating to the failure to a source node located elsewhere in the mesh network. The source node(s) that include the failed node in at least one of the routes stored in a routing table used by the source node(s) will typically receive this information.

Upon receiving notification of a failed node, each source node may update its routing table to select an alternate route. The alternate route may already be stored in the route table, or the source node may explore the mesh network for a new route (e.g., using AODV). This approach may also be used to handle changes in node devices as part of reconfiguring the network as changes in network topology are implemented, or to respond to other link breakages. Also, as mentioned above, in the event of the failure of a lead node for a given mesh, in a preferred approach, any other node in that mesh could assume the role of lead node.

Load Balancing

As traffic on a mesh network increases, it is typically desirable to add additional connection points to external networks such as external networks 314 and 316 in FIG. 3. Traffic through the mesh network may be load balanced across these external gateways. Further, the nodes in the mesh network may be configured (e.g., using software included on device 200) so that there is an automatic fail-over mechanism in case an external gateway (e.g., an Internet gateway) fails due to loss of power, gateway failure, or otherwise. Also, as new external gateways are connected, the nodes in the mesh network may adjust their configuration so that traffic load is redistributed and the number of hops from each node to the external gateway is minimized.

Also, static load balancing may be implemented. For example, each node may store a table of gateways to external networks (e.g., gateways to wired networks). Through the use of network management/configuration, the gateway addresses may be communicated to each first-level node and to other nodes acting as access points (collectively referred to as "end nodes"). The table entries may have an order associated to them. For example, the end node may always use a designated primary gateway number to communicate with the outside world. It also may use the keep alive approach described above to sense if this primary gateway is down. If the primary gateway fails, then the node may switch to a secondary gateway stored in the table. The order assignment of the table entries may be done by, for example, an off-line algorithm.

Traffic Management

Several traffic management features may be implemented in the mesh network described above. For example, this may include a policing feature in which each end user has a defined service level (e.g., 256 Kbps). The traffic for the user may be monitored to ensure that the limit is not violated. This policing may also ensure that the user always obtains any guaranteed minimum level of services.

Traffic management may also include priority routing in which traffic is classified, for example, into four priority classes (e.g., voice, guaranteed data, best efforts data, and other). Each node may have, for example, four priority queues at each of its interfaces with each traffic class queued into its their respective output queue. The queues may be serviced (i.e., packets transmitted) based on a configurable scheduling mechanism (e.g., round-robin, weighted round-robin, preemptive, non-preemptive).

Another aspect of traffic management may include congestion avoidance in which, by a node's sensing the load in portions of the mesh network, a connection is created by a node only when there is sufficient bandwidth, for example, to ensure a quality connection. Load may be sensed, for example, by examining the length of the queues at a node. Also, each node may be configured to sense the network load and throttle back the best-effort traffic so that higher priority traffic may pass through.

Traffic management may additionally include, for voice traffic within each cluster, a manner of operation in which nodes will transmit voice in an orderly fashion (e.g., the sending of voice traffic in preference to data traffic). One benefit of this may be the reduction of jitter. Also, to further reduce jitter, buffering of voice traffic at one or more nodes may be used to smooth out the voice delivery to the end user.

Closed Loop Optimization

When planning is started for a new network or for new nodes/elements (e.g., router, voice gateways, etc.) that may be introduced into the network, it is may be desirable to simulate and predict the effect of the changes. When dealing with a lot of variables in a mesh network (e.g., ranging from the radio frequency issues in the environment to human behavioral issues), closed loop optimization and planning may provide significant advantages. The closed loop optimization approach provides the network operator/manager the ability to make intelligent decisions regarding the mesh network. The visibility into the network through such analysis may assist the network operator to save time and cost in overseeing and managing the network.

Closed loop optimization may be implemented in several basic steps (e.g., track, analyze, model, decide, and act). To track is to collect the vitals of the existing network. Through off-line simulation the vitals are fed to the network model to see the shortcoming of the existing network architecture/topology. Once the short-comings are identified, then a new model is generated that suggests where improvements can be made. Then, a decision whether to implement the improvements is made and acted upon.

Decisions whether to implement an improvement may be made, for example, by an Internet service provider (ISP) manager. The decision is often typically made based on the severity of the problem in terms of performance and the cost of alternative solutions to improve performance and robustness. By re-configuring the mesh network using the above approach, there may be no need for additional new equipment, which would reduce cost.

Since a large mesh network is typically a dynamic network environment (e.g., in which users are added and removed from the network, the users each have different behaviors, and the behaviors typically change over time), it is preferred that there be a dynamic/automatic way to tune the network. Typically, the network is being constantly monitored and analyzed by dynamic activity. The use of the analysis tool described above assists the network operator in making intelligent operational decisions.

Roaming

Roaming may be supported by the mesh network (e.g., low-speed roaming). For example, a user may move around with a wireless device (e.g., a WiFi phone, or a PDA) and remain connected to the network. As they are moving away from a first access point (as determined, e.g., by checking the applicable RSSI), a new access point may be detected and the connection (e.g., destination IP address) and security (e.g., assignment of a new key), and other content may be either forwarded to or negotiated with a next access point.

CONCLUSION

By the foregoing disclosure, an improved system and method for a building and operating a wireless communications mesh network have been described. Although specific exemplary systems and methods were described above, one of skill in the art will recognize that in other embodiments many of the above steps may be re-arranged and/or omitted. The foregoing description of specific embodiments reveals the general nature of the disclosure sufficiently that others can, by applying current knowledge, readily modify and/or adapt it for various applications without departing from the generic concept. For example, in other embodiments the disclosed systems and methods may be modified for use with cellular telephone systems and with utility meter monitoring systems. Therefore, such adaptations and modifications are within the meaning and range of equivalents of the disclosed embodiments. The phraseology or terminology employed herein is for the purpose of description and not of limitation.

The invention claimed is:

1. A wireless mesh network comprising:
a first plurality of nodes organized in a first-level mesh, wherein one of the first plurality of nodes operates as a gateway node for the first-level mesh;
a second plurality of nodes organized in a second-level mesh;
wherein the gateway node for the first-level mesh is coupled to communicate with the second-level mesh;
wherein at least one node in the first plurality of nodes is configured to detect the presence of a failed node in the mesh network and to communicate information relating to the failure to a source node that includes the failed node in at least one of the routes in a routing table stored at the source node; and
wherein the source node is operable to update the routing table to select an alternate route in response to receiving the information relating to the failure.

2. The mesh network of claim 1 wherein:
two or more of the first plurality of nodes are wireless access point nodes; and
two or more of the second plurality of nodes are gateway nodes.

3. The mesh network of claim 1 wherein each of the first plurality of nodes and at least one of the second plurality of nodes comprises a radio for wireless communications with another node in the mesh network.

4. The mesh network of claim 1 further comprising a third plurality of nodes organized in a third-level mesh, wherein one of the second plurality of nodes is a gateway node for the second-level mesh, and the gateway node for the second-level mesh is coupled to communicate with the third-level mesh.

5. The mesh network of claim 1 wherein the gateway node for the first-level mesh comprises:
a processor;
a first radio coupled to the processor;
a second radio coupled to the processor; and
wherein the first radio communicates with at least one of the first plurality of nodes, and the second radio communicates with at least one of the second plurality of nodes.

6. The mesh network of claim 5 wherein the gateway node for the first-level mesh further comprises a memory, coupled to the processor, having computer-executable instructions to control the channel selection and radio signal power output of the first radio.

7. The mesh network of claim 1 wherein each of the first plurality of nodes and each of the second plurality of nodes comprises:
a processor;
a memory coupled to the processor;
a first radio controlled by the processor; and
a second radio controlled by the processor.

8. The mesh network of claim 7 wherein the memory has computer-executable instructions to control the channel selection and radio signal power output of the first radio.

9. The mesh network of claim 8 wherein:
the first-level mesh is one of a plurality of first-level meshes coupled to communicate with the second-level mesh;
the first plurality of nodes communicates within the first-level mesh using a first channel; and
the instructions in the respective memory for each of the first plurality of nodes to control the channel selection comprise instructions to select a frequency for the first channel that is different from the frequency used for communications within another one of the plurality of first-level meshes in close proximity to the first plurality of nodes.

10. The mesh network of claim 1 wherein at least one of the second plurality of nodes is coupled to communicate with an external network.

11. The mesh network of claim 1 wherein another one of the first plurality of nodes is configured to operate as a back-up node to the gateway node for communications to the second-level mesh in the event the gateway node ceases communication with the second-level mesh.

12. The mesh network of claim 1 wherein each of the second plurality of nodes is coupled to a first-level mesh having a size in accordance with a self-configuration algorithm of no more than a predetermined total number of nodes.

13. The mesh network of claim 1 wherein each of the second plurality of nodes comprises:
a processor;
a memory coupled to the processor;
a first radio controlled by the processor; and
a second radio controlled by the processor.

14. The mesh network of claim 13 wherein the respective memory stores computer-executable instructions to control the configuration of each of the second plurality of nodes so that each of the second plurality of nodes is coupled to a first-level mesh having a size of no more than a predetermined total number of nodes.

15. The mesh network of claim 14 wherein each of the first plurality of nodes comprises:
a processor;
a memory coupled to the processor;
a first radio controlled by the processor;
a second radio controlled by the processor; and
wherein the respective memory stores computer-executable instructions to control the configuration of each of the first plurality of nodes so that each of the first plurality of nodes is substantially in close proximity to one another relative to nodes contained in other first-level meshes coupled to the second-level mesh.

16. A wireless mesh network comprising:
a plurality of first-level meshes, wherein each of the plurality of first-level meshes comprises a plurality of access point nodes;
a second plurality of gateway nodes organized in a second-level mesh, wherein each of the gateway nodes provides a communications gateway from at least one of the plurality of first-level meshes to the second-level mesh;
wherein the plurality of access point nodes within one mesh of the plurality of first-level meshes communicates using a common frequency;
wherein the common frequency for the one mesh of the plurality of first-level meshes is different from the common frequency used for communications within another one of the plurality of first-level meshes;
wherein at least one node in the plurality of access point nodes within the one mesh of the plurality of first-level meshes is configured to sense the presence of a failed node in the mesh network and to communicate information relating to the failure to a source node that includes the failed node in at least one of the routes stored in a routing table used by the source node; and
wherein the source node is operable to update the routing table to select an alternate route in response to receiving the information relating to the failure.

17. The mesh network of claim 16 wherein:
each of the respective plurality of access point nodes comprises a respective radio; and
the signal power output of the respective radio is controlled to reduce radio interference with access point nodes in a different one of the plurality of first-level meshes.

18. The mesh network of claim 16 wherein the common frequency is selected from one or more of the channels defined by an 802.11 wireless standard.

19. A wireless mesh network comprising:
a first plurality of nodes, each node configured to organize into a first-level mesh by scanning for the presence of other nodes and configuring its respective routing information in response to the scanning, wherein one of the first plurality of nodes is further configured to operate as a gateway node for the first-level mesh;
a second plurality of nodes, each node configured to organize into a second-level mesh by scanning for the presence of other nodes and configuring its respective routing information in response to the scanning;
wherein the gateway node for the first-level mesh is further configured to communicate with the second-level mesh;
wherein each of the first plurality of nodes and each of the second plurality of nodes comprises:
(i) a processor;
(ii) a memory coupled to the processor;
(iii) a first radio; and
(iv) a second radio;
wherein the respective memory stores computer-executable instructions to select a route for wireless communications from the respective node within the mesh network;
wherein at least one node in the first plurality of nodes is configured to detect the presence of a failed node in the mesh network and to communicate information relating to the failure to a source node that includes the failed node in at least one of the routes in a routing table stored by the source node; and
wherein the source node is operable to update the routing table to select an alternate route in response to receiving the information relating to the failure.

20. The mesh network of claim 19 wherein the at least one node in the first plurality of nodes is further configured to periodically check for the presence of the failed node.

21. The mesh network of claim 19 wherein, for each of the first plurality of nodes:

the first radio communicates with an end-user device;
the second radio communicates with at least another of the first plurality of nodes; and
the first radio and second radio operate within different frequency spectrums.

22. The mesh network of claim 21 wherein the end-user device is selected from the group consisting of: a personal computer, a telephone, and a personal digital assistant.

23. The mesh network of claim 19 wherein each of the first plurality of nodes is further configured to store information in its respective routing table to record an identifier of the closest nodes detected during the scanning along with the respective relative signal strengths received from the closest nodes.

24. A wireless mesh network comprising:
a first plurality of nodes organized in a first-level mesh, wherein one of the first plurality of nodes operates as a lead node for the first-level mesh;
a second plurality of nodes organized in a second-level mesh, wherein the lead node for the first-level mesh is coupled to communicate with the second-level mesh;
wherein each of the first plurality of nodes and each of the second plurality of nodes stores computer-executable instructions to select one or more routes for wireless communications by the node within the mesh network;
wherein at least one node in the first plurality of nodes is configured to sense the presence of a failed node in another of the first plurality of nodes and to communicate information relating to the failure to a source node in the mesh network that includes the failed node in at least one of the routes stored in a routing table used by the source node; and
wherein the source node is operable to update the routing table to select an alternate route in response to receiving the information relating to the failure.

25. The mesh network of claim 24 wherein the at least one node in the first plurality of nodes is configured to periodically check for the presence of the failed node.

26. The mesh network of claim 24 wherein the source node selects the alternate route by exploring the mesh network for a new route.

27. The mesh network of claim 24 wherein each of the first plurality of nodes comprises memory storing computer-executable instructions to control the configuration of the respective node so that the first-level mesh has a size of no more than a first predetermined total number of nodes.

28. The mesh network of claim 27 wherein the first predetermined total number is no more than 50.

29. The mesh network of claim 27 wherein each of the second plurality of nodes comprises memory storing computer-executable instructions to control the configuration of the respective node so that the second-level mesh has a size of no more than a second predetermined total number of nodes.

30. The mesh network of claim 29 wherein the second predetermined total number is less than the first predetermined total number.

31. The mesh network of claim 24 wherein each of the first plurality of nodes comprises first and second radios, and the first radio is configured to limit its signal power output to reduce radio interference with other nodes in the mesh network.

32. The mesh network of claim 31 wherein the second radio communicates with an end-user device.

33. The mesh network of claim 24 wherein each of the first plurality of nodes further stores a session identifier so that packets associated with the session identifier are directed from the respective node using a common route.

34. A wireless mesh network comprising:
a first plurality of nodes organized in a first-level mesh, wherein each of the first plurality of nodes is configured to detect the presence of a failed node in the mesh network and to communicate information relating to the failure to a source node that includes the failed node in at least one of the routes of a routing table stored on the source node, the source node being operable to update the routing table to select an alternate route in response to receiving the information relating to the failure;
a second plurality of nodes organized in a second-level mesh and comprising a plurality of gateway nodes, wherein at least one node of the first plurality of nodes is coupled to communicate with the second-level mesh; and
wherein each of the first plurality of nodes and each of the second plurality of nodes stores computer-executable instructions to select one or more routes for wireless communications by the node within the mesh network.

35. The mesh network of claim 34 wherein each of the plurality of gateway nodes provides a communications path for a first-level mesh to an external network, and the mesh network is configured to do load balancing on communication traffic across each of the plurality of gateway nodes when a new gateway node is added to the second-level mesh.

36. The mesh network of claim 34 wherein each of the plurality of gateway nodes provides a communications path for a first-level mesh to an external network, and the mesh network is configured to do load balancing on communication traffic across each of the plurality of gateway nodes if one of the plurality of gateway nodes fails.

37. The mesh network of claim 34 wherein each of the first plurality of nodes comprises first and second radios, each respective first radio is configured to communicate with nodes in the first-level mesh, and each respective second radio is configured to communicate with nodes in the second-level mesh.

38. The mesh network of claim 34 wherein the first-level mesh comprises a back-up node configured to provide communications with the second-level mesh in the event a gateway node for the first-level mesh fails.

39. The mesh network of claim 34 wherein the at least one node of the first plurality of nodes comprises first and second nodes, and the mesh network is configured to do load balancing on communication traffic across the first and second nodes as new nodes are added to the first-level mesh.

40. The mesh network of claim 34 wherein the at least one node of the first plurality of nodes comprises first and second nodes, and the mesh network is configured to do load balancing on communication traffic across the first and second nodes if one or more nodes in the first-level mesh fail.

* * * * *